Oct. 30, 1962     E. P. BUSILLO     3,060,738
FLOWMETER
Filed May 23, 1958
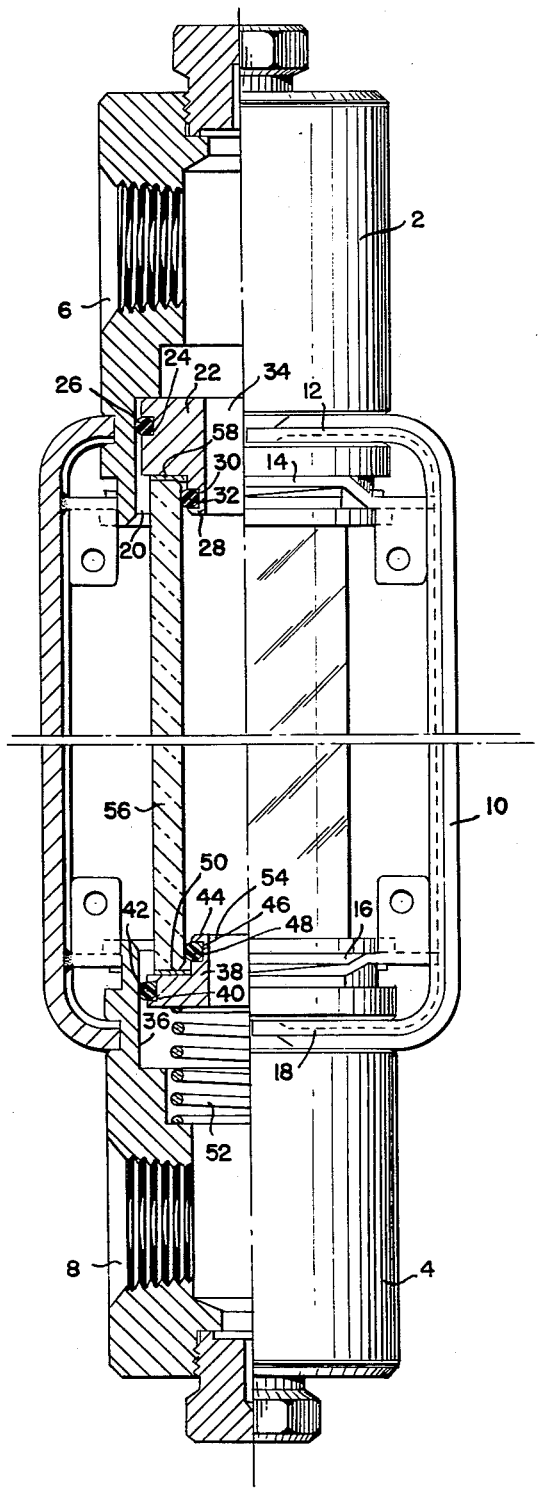
INVENTOR.
EUGENE P. BUSILLO
BY
ATTORNEYS

United States Patent Office 3,060,738
Patented Oct. 30, 1962

3,060,738
FLOWMETER
Eugene P. Busillo, Huntingdon Valley, Pa., assignor to Fischer & Porter Company, Hatboro, Pa., a corporation of Pennsylvania
Filed May 23, 1958, Ser. No. 737,324
11 Claims. (Cl. 73—209)

This invention relates to flowmeters of the variable area type comprising tubes containing members movable under the action of fluid flow, and particularly to features of construction making possible the ready removal and replacement of tubes. For consistency of description the invention will be described as applied to a rotameter as an example of the type of flow meter to which the invention is applicable.

Conventional rotameters comprise housings mounting end fittings in which the glass tubes have been supported with tightness assured by the use of packing glands. Removability of the tubes has been troublesome and the fragile tubes are susceptible to breakage during removal and replacement. Furthermore, the tight mountings provided by the packing glands have occasioned the transmission to the tubes of such stresses as may be involved in making or adjusting pipe connections to the end fittings, resulting in breakages. Removability of tubes is a practical requirement in order to make possible cleaning of the tubes and floats.

It is the general object of the present invention to provide a rotameter construction in which tubes are mounted in fluid tight fashion but so as to be readily removed and replaced by a simple manual manipulation without the use of any tools and without danger of breakage. Furthermore, the tubes are resiliently mounted and effectively free of any transmission of forces to their ends such as might result from manipulations involving the end fittings.

The invention further offers the advantage that rotameters having different sizes of tubes may be constructed using the same frame elements and end fittings, the only differences between such rotameters involving the use of adaptors of different sizes.

The attainment of the foregoing objects as well as others relating to details will become apparent from the following description, read in conjunction with the accompanying drawing, in which the figure is an elevation, partly in section, illustrating the improved construction.

The rotameter comprises upper and lower end fittings 2 and 4, respectively, provided with tapped openings such as 6 and 8 for pipe connections, the end fittings also being desirably provided with axially threaded openings which may be alternatively used, the unused openings being plugged. The housing is of simple construction comprising side plates such as 10 provided with inturned ends and brackets as indicated at 12, 14, 16 and 18 which engage within circumferential grooves in the end fittings, these side plates being connected by front and rear plates, at least one of which is provided with a removable window through which the rotometer tube and float may be viewed. A normally closed protective housing is thus produced, the housing holding the end fittings 2 and 4 in spaced axial alignment.

Within a cylindrical bore 20 in the upper fitting 2 there is located an adaptor 22 provided with an external circumferential groove 24 in which is located an O-ring 26 which bears against the wall of the bore 20. The adaptor 22 has a downward annular extension 28 which is externally provided with a circumferential groove 30 for the mounting of an O-ring 32. The adaptor has a central opening 34 for the passage of fluid.

The lower fitting 4 has a cylindrical bore 36 within which is located a lower adaptor 38 provided with a circumferential groove 40 in which is mounted an O-ring 42 bearing against the inner wall of the bore 36. This lower adaptor 38 is provided with an upward extension 44 provided with an external circumferential groove 46 for the reception of an O-ring 48. A resilient gasket 50 is located on the shoulder of the adaptor 38. A helical spring 52 seated on a shoulder in the fitting 4 urges the adaptor 38 upwardly. The adaptor 38 is provided with a central fluid passage 54.

A conventional glass rotameter tube is indicated at 56 and may have any of the usual internal constructions. In any event, its upper and lower ends provide precision bores for engagement with the O-rings 32 and 48. The tube 56, containing the usual float (not shown) is, as illustrated in the drawing, mounted between the resilient gaskets 50 and 58 and thus between the adaptors 22 and 38, the spring 52 exerting a yielding upward force to maintain the assembly as shown. The force exerted by this spring may be little more than required to overcome the weight of the tube 56 and the float. Tightness of the packing does not depend on the force exerted by this spring, the various O-rings functioning in their characteristic fashions to maintain tightness of the joints without the exertion of longitudinal stresses. It may be noted that the construction is such that large fluid pressures in the interior of the rotameter will not produce compression of the spring 52 so as to release the tube.

It will be noted that circumferential chamfers are provided at the upper and lower inner edges of the tube bore.

The advantages of the invention will now be apparent. A tube may be readily removed, after removal of the window or one of the cover plates of the housing, merely by grasping it with the fingers and moving it downwardly to compress the spring 52 to a sufficient extent to cause the upper end of the tube to clear the bottom of the upper adaptor 22. By pulling the tube at an angle it may be rocked about the O-ring 48 so that its upper end is completely clear of the bottom of the upper adaptor, whereupon it may be readily lifted from the O-ring 48. Its replacement is then readily effected in reverse fashion.

In all of the foregoing procedure there is no necessity for applying any stresses to the tube which may result in damage, the tube contacting the other parts of the assembly only through the resilient O-rings. Chipping of the tube ends is prevented by the resilient gaskets 50 and 58 which, it will be noted, are not depended upon at all for fluid tightness.

Furthermore, it will be evident that forces applied to the end fittings as in making or breaking connections can be applied to the rotameter tube only through the resilient gaskets, thus relieving the tube of any stresses of sufficient magnitude as might produce breakage.

Advantage is also provided from the standpoint of manufacturing in that it will be evident that if it is desired to replace a tube and corresponding float by one of different size bore, the only change necessary involves the substitution of adaptors having different size extensions 28 and 44 and their corresponding O-rings, the adaptors having the same diameters for assembly with the bores 20 and 36 of the end fittings. Thus, a wide range of rotameters may be provided utilizing the same end fittings and housing parts. Of course in the case of longer or shorter tubes the housings will also be required to be longer or shorter but the end fittings may be the same.

Another advantage of the invention is afforded by the differences in diameters of the O-rings of each adaptor. Each adaptor is in self-sealing relationship to its end of the tube. The large ring of each is urged towards the tube by internal pressure while the smaller is urged outwardly. But the difference in effective piston areas is such that the net effect is that of producing a force on each adaptor towards its tube end. This not only is in the right direction to produce better sealing but the tube is put under compression to offset to an extent bursting forces. Thus higher pressures may be safely handled.

From the foregoing description it will be evident that the described flowmeter comprises spaced mounting means, the upper comprising the elements 2 and 22, and the lower comprising the elements 4 and 38. The spaced mounting means are provided with the fixedly spaced coupling devices 2 and 4 for connecting the flowmeter to fixed parts of an external conduit, and the spaced mounting means have the axially aligned fluid passages 34 and 54. Each of the mounting means has a portion (28 and 44) bounding its fluid passage and extending telescopically into, and overlapping axially, a corresponding end of the bore of the tube 56. Each of these portions 28 and 44 has an external annular groove with a resilient O-ring packing within its groove and extending outwardly into engagement with the inner surface of the corresponding end of the bore of the tube. Spring means 52 acts (through the lower adaptor 38) to urge the tube to a sealed position with respect to the portion 28.

It will be evident that the invention is applicable to various types of variable flowmeters and that various changes in details of construction may be adopted without departing from the invention as defined in the following claims.

What is claimed is:

1. A flowmeter comprising spaced mounting means provided with fixedly spaced coupling devices for connecting the flowmeter to fixed parts of an external conduit, said means having axially aligned fluid passages, a tube having a bore and bridging said mounting means, a metering float within the bore of said tube, each of said mounting means having a portion bounding its fluid passage and extending telescopically into, and overlapping axially, a corresponding end of the bore of said tube, each of said portions having an external annular groove, and an annular resilient packing surrounding said portion of each means within the groove thereof and extending outwardly from its groove into engagement with the inner surface of the corresponding end of the bore of the tube to seal said portion to said inner surface, said tube having freedom of axial sliding movement relative to said portions and relative to said resilient packings, so that it may be removed from said portions without disturbance of the connections of the flowmeter to the fixed parts of the external conduit.

2. A flowmeter according to claim 1 in which the annular resilient packings are provided by O-rings.

3. A flowmeter comprising spaced mounting means provided with fixedly spaced coupling devices for connecting the flowmeter to fixed parts of an external conduit, said means having axially aligned fluid passages, a tube having a bore and bridging said mounting means, a metering float within the bore of said tube, each of said mounting means having a portion bounding its fluid passage and extending telescopically into, and overlapping axially, a corresponding end of the bore of said tube, each of said portions having an external annular groove, an annular resilient packing surrounding said portion of each means within the groove thereof and extending outwardly from its groove into engagement with the inner surface of the corresponding end of the bore of the tube to seal said portion to said inner surface, said tube having freedom of axial sliding movement relative to said portions and relative to said resilient packings, and spring means acting to urge said tube to a sealed position with respect to one of said portions, so that it may be removed from said portions without disturbance of the connections of the flowmeter to the fixed parts of the external conduit.

4. A flowmeter according to claim 3 in which the annular resilient packings are provided by O-rings.

5. A flowmeter comprising a frame, means carried by said frame and mounted thereby in fixed spaced relation to each other for connecting the flowmeter to fixed portions of a conduit, an annular mounting member located in each of said spaced means and removable therefrom without disturbance of the connections of said means to their respective portions of a conduit, sealing devices between each of said mounting members and its corresponding means effective to maintain sealed relationship between them despite limited movement of the mounting member, said mounting members having axially aligned fluid passages, a tube having a bore and cylindrical ends and bridging said mounting members, a metering float within the bore of said tube, each of said mounting members having a portion bounding its fluid passage and telescopically overlapping axially a corresponding cylindrical end of said tube, each of said portions having an annular groove facing the adjacent cylindrical end of the tube, and an annular resilient packing within each such groove and extending from the groove into engagement with the corresponding cylindrical end of the tube to seal said portion to the tube, said resilient packings allowing free axial sliding movement of said tube relative to said portions, and said tube having freedom of axial movement relative to the first mentioned means.

6. A flowmeter comprising a frame, means carried by said frame and mounted thereby in fixed spaced relation to each other for connecting the flowmeter to fixed portions of a conduit, an annular mounting member located in each of said spaced means and removable therefrom without disturbance of the connections of said means to their respective portions of a conduit, sealing devices between each of said mounting members and its corresponding means effective to maintain sealed relationship between them despite limited movement of the mounting member, said mounting members having axially aligned fluid passages and at least one of said mounting members being movable axially relatively to its corresponding means, a tube having a bore and cylindrical ends and bridging said mounting members, a metering float within the bore of said tube, each of said mounting members having a portion bounding its fluid passage and telescopically overlapping axially a corresponding cylindrical end of said tube, each of said portions having an annular groove facing the adjacent cylindrical end of the tube, and an annular resilient packing within each such groove and extending from the groove into engagement with the corresponding cylindrical end of the tube to seal said portion to the tube, said resilient packings allowing free axial sliding movement of said tube relative to said portions, and said tube having freedom of axial movement relative to the first mentioned means.

7. A flowmeter comprising a frame, means carried by said frame and mounted thereby in fixed spaced relation to each other for connecting the flowmeter to fixed portions of a conduit, an annular mounting member located in each of said spaced means and removable therefrom without disturbance of the connections of said means to their respective portions of a conduit, sealing devices between each of said mounting members and its corresponding means effective to maintain sealed relationship between them despite limited movement of the mounting member, said mounting members having axially aligned fluid passages and at least one of said mounting members being movable axially relatively to its corresponding means, a tube having a bore and cylindrical ends and bridging said mounting members, a metering float within the bore of said tube, each of said mounting members having a portion bounding its fluid passage and telescopically overlapping axially a corresponding cylindrical end of said tube, each of said portions having an annular groove facing the adjacent cylindrical end of the tube, an annular resilient packing within each such groove and extending from the groove into engagement with the corresponding cylindrical end of the tube to seal said portion to the tube, said resilient packings allowing free axial sliding movement of said tube relative to said portions, and said tube having freedom of axial movement relative to the first mentioned means, and a spring yieldingly urging said mounting members towards each other.

8. A flowmeter comprising a frame, means carried by said frame and mounted thereby in fixed spaced relation to each other for connecting the flowmeter to fixed portions of a conduit, an annular mounting member located in each of said spaced means and removable therefrom without disturbance of the connections of said means to their respective portions of a conduit, sealing devices between each of said mounting members and its corresponding means effective to maintain sealed relationship between them despite limited movement of the mounting member, said mounting members having axially aligned fluid passages, a tube having a bore and bridging said mounting members, a metering float within the bore of said tube, each of said mounting members having a portion bounding its fluid passage and extending telescopically into, and overlapping axially, a corresponding end of the bore of said tube, each of said portions having an external annular groove, and an annular resilient packing surrounding said portion of each member within the groove thereof and extending outwardly from its groove into engagement with the inner surface of the corresponding end of the bore of the tube to seal said portion to said inner surface, said tube having freedom of axial sliding movement relative to said portions and relative to said resilient packings.

9. A flowmeter comprising a frame, means carried by siad frame and mounted thereby in fixed spaced relation to each other for connecting the flowmeter to fixed portions of a conduit, an annular mounting member located in each of said spaced means and removable therefrom without disturbance of the connections of said means to their respective portions of a conduit, sealing devices between each of said mounting members and its corresponding means effective to maintain sealed relationship between them despite limited movement of the mounting member, said mounting members having axially aligned fluid passages and at least one of said mounting members being movable axially relatively to its corresponding means, a tube having a bore and bridging said mounting members, a metering float within the bore of said tube, each of said mounting members having a portion bounding its fluid passage and extending telescopically into, and overlapping axially, a corresponding end of the bore of said tube, each of said portions having an external annular groove, and an annular resilient packing surrounding said portion of each member within the groove thereof and extending outwardly from its groove into engagement with the inner surface of the corresponding end of the bore of the tube to seal said portion to said inner surface, said tube having freedom of axial sliding movement relative to said portions and relative to said resilient packings.

10. A flowmeter comprising a frame, means carried by said frame and mounted thereby in fixed spaced relation to each other for connecting the flowmeter to fixed portions of a conduit, an annular mounting member located in each of said spaced means and removable therefrom without disturbance of the connections of said means to their respective portions of a conduit, sealing devices between each of said mounting members and its corresponding means effective to maintain sealed relationship between them despite limited movement of the mounting member, said mounting members having axially aligned fluid passages and at least one of said mounting members being movable axially relatively to its corresponding means, a tube having a bore and bridging said mounting members, a metering float within the bore of said tube, each of said mounting members having a portion bounding the fluid passage and extending telescopically into, and overlapping axially, a corresponding end of the bore of said tube, each of said portions having an external annular groove, an annular resilient packing surrounding said portion of each member within the groove thereof and extending outwardly from its groove into engagement with the inner surface of the corresponding end of the bore of the tube to seal said portion to said inner surface, said tube having freedom of axial sliding movement relative to said portions and relative to said resilient packings, and a spring yieldingly urging said mounting members towards each other.

11. A flowmeter comprising spaced mounting means provided with fixedly spaced coupling devices for connecting the flowmeter to fixed parts of an external conduit, said means having axially aligned fluid passages, a tube having a bore and bridging said mounting means, a metering float within the bore of said tube, each of said mounting means having a portion bounding its fluid passage and extending telescopically into, and overlapping axially, a corresponding end of the bore of said tube, each of said portions having an external annual groove, an annular resilient packing surrounding said portion of each means within the groove thereof and extending outwardly from its groove into engagement with the inner surface of the corresponding end of the bore of the tube to seal said portion to said inner surface, said tube having freedom of axial sliding movement relative to said portions and relative to said resilient packings, and spring means acting to urge said tube to a sealed position with respect to one of said portions, at least one of said mounting means comprising a pair of separate telescopically related elements one of which is provided with such fixedly spaced coupling device and the other of which is movable relatively thereto and provides the portion of such means bounding its fluid passage as aforesaid, and a sealing device between said elements effective to maintain sealed relationship between them despite limited relative movements thereof, so that the last mentioned element may be removed from the first mentioned element without disturbance of the connections of the flowmeter to the fixed parts of the external conduit.

References Cited in the file of this patent
UNITED STATES PATENTS

| 1,246,752 | Kelley | Nov. 13, 1917 |
| 2,778,223 | Kimbrell | Jan. 22, 1957 |
| 2,783,646 | Rumble | Mar. 5, 1957 |
| 2,882,725 | Goodhue et al. | Apr. 21, 1959 |
| 2,957,494 | Stenberg | Oct. 25, 1960 |

FOREIGN PATENTS

| 138,357 | Germany | Nov. 28, 1901 |